(12) United States Patent
Barton et al.

(10) Patent No.: US 6,423,439 B1
(45) Date of Patent: *Jul. 23, 2002

(54) MEMBRANE ELECTRODE ASSEMBLY FOR AN ELECTROCHEMICAL FUEL CELL

(75) Inventors: Russell H. Barton, New Westminster; Peter R. Gibb, Coquitlam; Joel A. Ronne, Vancouver; Henry H. Voss, West Vancouver, all of (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/545,274

(22) Filed: Apr. 7, 2000

Related U.S. Application Data

(63) Continuation-in-part of application No. 09/116,179, filed on Jul. 15, 1998, now Pat. No. 6,057,054
(60) Provisional application No. 60/052,713, filed on Jul. 16, 1997.

(51) Int. Cl.$^7$ ................................................ H01M 2/08
(52) U.S. Cl. ............................ 429/35; 429/36; 429/38; 429/42
(58) Field of Search ............................... 429/42, 40, 35, 429/41, 38, 34, 37, 36

(56) References Cited

U.S. PATENT DOCUMENTS

| | | | |
|---|---|---|---|
| 4,588,661 A | 5/1986 | Kaufman et al. | 429/36 |
| 4,786,568 A | 11/1988 | Elmore et al. | 429/44 |
| 4,929,517 A | 5/1990 | Luoma et al. | 429/34 |
| 4,997,732 A | 3/1991 | Austin et al. | 429/153 |
| 5,096,786 A | 3/1992 | Granata, Jr. et al. | 429/35 |
| 5,176,966 A * | 1/1993 | Epp et al. | 429/26 |
| 5,187,025 A | 2/1993 | Kelland et al. | 429/33 |
| 5,219,674 A | 6/1993 | Singelyn et al. | 429/36 |
| 5,240,786 A | 8/1993 | Ong et al. | 429/36 |
| 5,262,249 A | 11/1993 | Beal et al. | 429/26 |
| 5,264,299 A | 11/1993 | Krasij et al. | 429/30 |
| 5,284,718 A | 2/1994 | Chow et al. | 429/26 |
| 5,464,700 A | 11/1995 | Steck et al. | 429/30 |
| 5,523,175 A | 6/1996 | Beal et al. | 429/30 |
| 6,057,054 A * | 5/2000 | Barton et al. | 429/42 |

FOREIGN PATENT DOCUMENTS

| | | |
|---|---|---|
| EP | 0604683 | 7/1994 |
| EP | 0774794 | 5/1997 |
| JP | 05-101837 | 4/1993 |
| JP | 08-148170 | 6/1996 |
| WO | WO 92/03854 | 3/1992 |
| WO | WO 98/33225 | 7/1998 |

\* cited by examiner

*Primary Examiner*—Stephen Kalafut
*Assistant Examiner*—Raymond Alejandro
(74) *Attorney, Agent, or Firm*—McAndrews, Held & Malloy, Ltd.

(57) ABSTRACT

An improved membrane electrode assembly ("MEA") comprises coextensive ion exchange membrane and electrode layers and a resilient fluid impermeable integral seal comprising a sealant material impregnated into the porous electrode layers in the sealing regions. The integral seal preferably circumscribes the electrochemically active area of the MEA. The integral seal preferably also extends laterally beyond the edge of the MEA. An integral seal may also be provided around any openings, such as external manifold openings formed outside the MEA. Preferably, the uncured sealant material is a flow processable elastomer applied using an injection molding process. In preferred embodiments the seal has a plurality of spaced, parallel raised ribs with cross-ribs extending therebetween at spaced intervals. The raised ribs and cross-ribs provide compartmentalized seals that provide improved protection against fluid leaks.

14 Claims, 6 Drawing Sheets

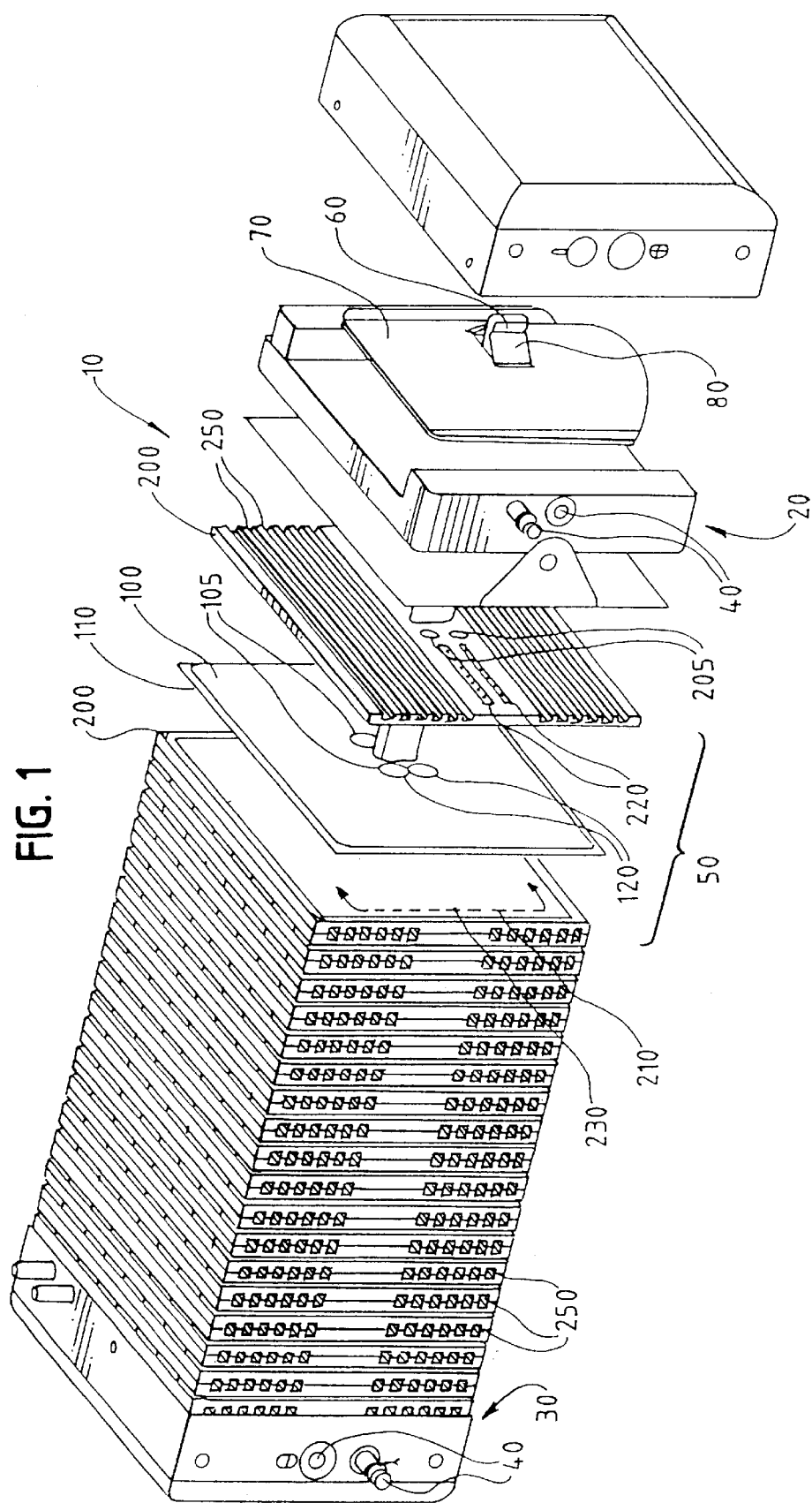

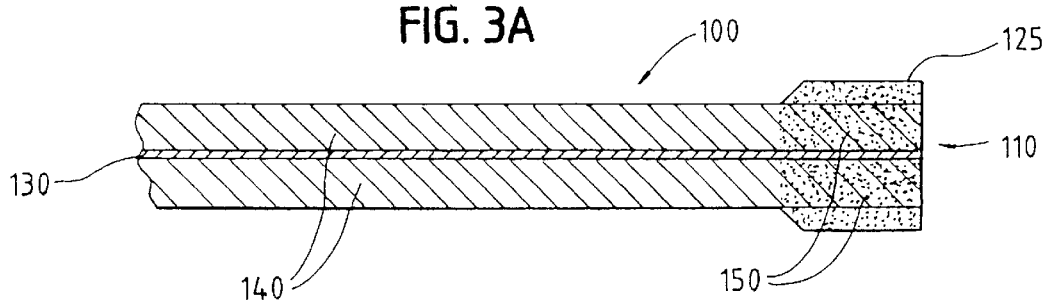
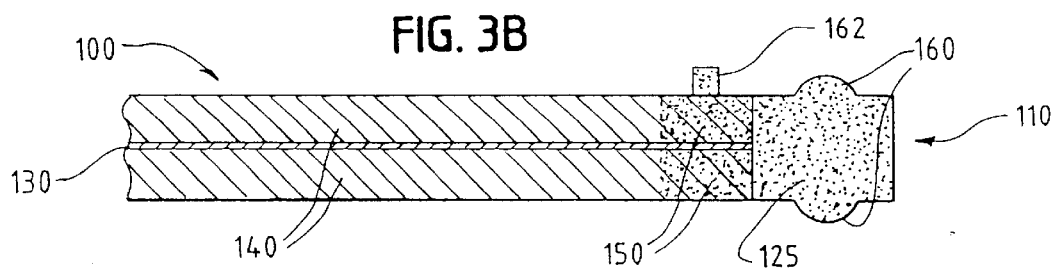
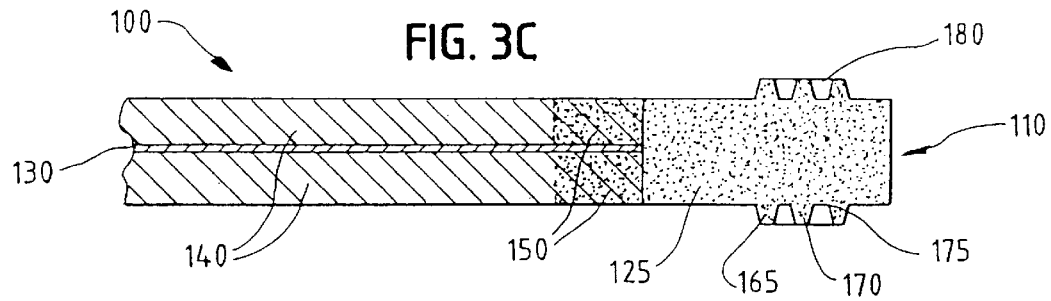
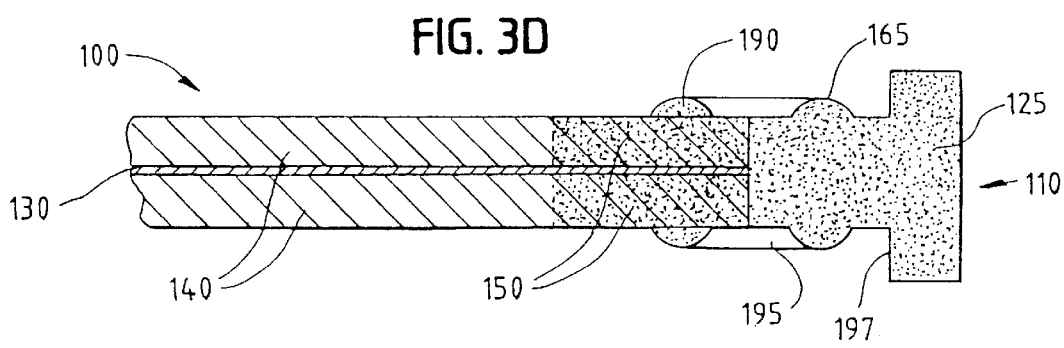

MEMBRANE ELECTRODE ASSEMBLY FOR AN ELECTROCHEMICAL FUEL CELL

CROSS-REFERENCE TO RELATED APPLICATIONS

This application is a continuation-in-part of U.S. patent application Ser. No. 09/116,179, filed on Jul. 15, 1998, now U.S. Pat. No. 6,057,054, entitled "An Improved Membrane Electrode Assembly for an Electrochemical Fuel Cell and a Method of Making an Improved Membrane Electrode Assembly". The '179 application, incorporated herein by reference in its entirety, relates to and claims priority benefits from U.S. Provisional Patent Application Serial No. 60/052,713 filed Jul. 16, 1997, which is also incorporated by reference herein in its entirety.

FILED OF THE INVENTION

The present invention relates to electrochemical fuel cells. In particular, the invention provides an improved membrane electrode assembly for a fuel cell, and a method of making an improved membrane electrode assembly. The improved membrane electrode assembly comprises integral fluid impermeable seals and coextensive electrode and membrane layers.

BACKGROUND OF THE INVENTION

Electrochemical fuel cells convert reactants, namely, fuel and oxidant fluid streams, to generate electric power and reaction products. Electrochemical fuel cells employ an electrolyte disposed between two electrodes, namely a cathode and an anode. The electrodes each comprise an electrocatalyst disposed at the interface between the electrolyte and the electrodes to induce the desired electrochemical reactions. The location of the electrocatalyst generally defines the electrochemically active area.

Solid polymer fuel cells generally employ a membrane electrode assembly ("MEA") consisting of a solid polymer electrolyte or ion exchange membrane disposed between two electrode layers comprising porous, electrically conductive sheet material. The membrane is ion conductive (typically proton conductive), and also acts as a barrier for isolating the reactant streams from each other. Another function of the membrane is to act as an electrical insulator between the two electrode layers. The electrodes must be electrically insulated from each other to prevent short-circuiting. If a multi-layer MEA is cut, tiny portions of the electrically conductive electrode material, such as stray fibers, may bridge across the thin membrane, interconnecting the electrodes, which could cause electrical short-circuiting in an operating fuel cell. Conventional MEAs incorporate a membrane with a larger surface area than the electrode layers, with at least a small portion of the membrane extending laterally beyond the edge of the electrode layers. The protruding membrane edge helps to prevent short-circuiting between the electrodes around the edge of the membrane. A problem with this is that it is difficult to cut an MEA after the electrodes have been joined to the membrane so that the thin membrane has a larger area than the electrodes. A conventional MEA is fabricated by manufacturing and cutting the electrodes and membrane layers separately. After the electrodes and membrane have been cut to the desired size and shape, the cut electrode layers are laminated with the cut membrane layer. These steps are not conducive to high speed manufacturing processes. It would be preferable to manufacture a sheet or roll of MEA material that already comprises the electrode and membrane layers, wherein this multi-layer material could then be cut to the desired size and shape for individual MEAs. An MEA cut in this way, such that the electrodes and membrane are coextensive, is described herein as being a "flush cut" MEA. However, this approach has heretofore been impractical because of the short circuiting problem described above.

In a fuel cell stack, the MEA is typically interposed between two separator plates that are substantially impermeable to the reactant fluid streams. The plates act as current collectors and provide support for the electrodes. To control the distribution of the reactant fluid streams to the electrochemically active area, the surfaces of the plates that face the MEA may have open-faced channels or grooves formed therein. Such channels or grooves define a flow field area that generally corresponds to the adjacent electrochemically active area. Such separator plates, which have reactant channels formed therein are commonly known as flow field plates. In a fuel cell stack a plurality of fuel cells are connected together, typically in series, to increase the overall output power of the assembly. In such an arrangement, one side of a given plate may serve as an anode plate for one cell and the other side of the plate may serve as the cathode plate for the adjacent cell. In this arrangement the plates may be referred to as bipolar plates.

The fuel fluid stream that is supplied to the anode typically comprises hydrogen. For example, the fuel fluid stream may be a gas such as substantially pure hydrogen or a reformate stream containing hydrogen. Alternatively, a liquid fuel stream such as aqueous methanol may be used. The oxidant fluid stream, which is supplied to the cathode, typically comprises oxygen, such as substantially pure oxygen, or a dilute oxygen stream such as air. In a fuel cell stack, the reactant streams are typically supplied and exhausted by respective supply and exhaust manifolds. Manifold ports are provided to fluidly connect the manifolds to the flow field area and electrodes. Manifolds and corresponding ports may also be provided for circulating a coolant fluid through interior passages within the stack to absorb heat generated by the exothermic fuel cell reactions.

It is desirable to seal reactant fluid stream passages to prevent leaks or inter-mixing of the fuel and oxidant fluid streams. Fuel cell stacks typically employ resilient seals between stack components. Such seals isolate the manifolds and the electrochemically active area of the fuel cell MEAs by circumscribing these areas. For example, a fluid tight seal may be achieved in a conventional fuel cell stack by using elastomeric gasket seals interposed between the flow field plates and the membrane, with sealing effected by applying a compressive force to the resilient gasket. Accordingly, it is important for conventional fuel cell stacks to be equipped with seals and a suitable compression assembly for applying a compressive force to the seals.

Conventional methods of sealing around plate manifold openings and MEAs within fuel cells include framing the MEA with a resilient fluid impermeable gasket, placing preformed gaskets in channels in the electrode layers and/or separator plates, or molding seals within grooves in the electrode layer or separator plate, circumscribing the electrochemically active area and any fluid manifold openings. Examples of conventional methods are disclosed in U.S. Pat. Nos. 5,176,966 and 5,284,718. Typically the gasket seals are cut from a sheet of gasket material. For a gasket seal that seals around the electrochemically active area of the MEA, the central portion of the sheet is cut away. This procedure results in a large amount of the gasket material being wasted. Because the electrodes are porous, for the gasket seals to operate effectively, the gasket seals ordinarily are in direct contact with the flow field plates and the ion exchange membrane. Therefore, in a conventional MEA, electrode material is cut away in the sealing regions so that the gasket will contact the ion exchange membrane. Some MEAs use additional thin-film layers to protect the ion exchange membrane where it would otherwise be exposed in the gasket seal areas. Separate components such as gasket seals and thin-film layers require respective processing or assembly steps, which add to the complexity and expense of manufacturing fuel cell stacks.

Accordingly, it is desirable to simplify and reduce the number of individual or separate components involved in sealing in a fuel cell stack since this reduces assembly time and the cost of manufacturing.

SUMMARY OF THE INVENTION

An improved MEA for an electrochemical fuel cell comprises:

(a) a first porous electrode layer;

(b) a second porous electrode layer;

(c) an ion exchange membrane interposed between the first and second porous electrode layers wherein said first and second electrode layers and said membrane are coextensive;

(d) a quantity of electrocatalyst disposed at the interface between the ion exchange membrane and each of the first and second porous electrode layers, thereby defining an electrochemically active area on each of the first and second electrode layers; and (e) a resilient fluid impermeable seal integral with the MEA, the seal comprising a fluid impermeable sealant material impregnated into the first and second porous electrode layers in sealing regions thereof and extending laterally beyond the membrane and the electrode layers to an external region, wherein the sealing regions comprise regions that circumscribe the electrochemically active area, and wherein the external region comprises regions that circumscribe external manifold openings therein.

In a preferred embodiment the sealing regions comprise regions that circumscribe the electrochemically active area of the electrode layers. Preferably the sealant material impregnates a portion of the MEA electrodes in the peripheral region and extends laterally beyond the edges of the electrode layers and membrane (that is, the sealant material envelops the membrane edge).

Where the MEA further comprises one or more openings formed therein, such as opening for a tension member, the sealing region further may comprise regions that circumscribe such openings.

In a fuel cell stack the sealing regions cooperate with the fuel cell separator plates to prevent fluids from leaking around the edges of the MEA. The sealant material is preferably an elastomer. In a preferred method of making an improved MEA, the sealant material is injection molded. Accordingly, it is desirable for the uncured sealant material to be flow processable. After the uncured sealant material has been applied to the MEA, it is allowed to cure to form a resilient elastomeric material. The elastomeric sealant material may be a thermosetting material, as long as the curing temperature is compatible with the MEA components, and in particular, the ion exchange membrane.

The sealant material may also be used to form a reference feature such as a raised edge or protrusion for assisting in the assembly of the fuel cell. For example, when an outer perimeter edge seal is being molded, at least one of the edges could be molded with a reference edge, which can be used to align the MEA during manufacturing processes. Alternatively, a protrusion such as a cylindrical plug could be molded in a location, which can be aligned with a corresponding cylindrical depression in an adjacent separator plate during stack assembly.

In another embodiment of the present membrane electrode assembly, the sealing regions comprise regions that circumscribe and extend into the electrochemically active area, and at least a portion of the sealing regions overlay reactant distribution ports of an adjacent fluid flow field plate. The sealing regions may assist in directing the flow of reactants to the flow field channels of the flow field plate and may protect the portion of the MEA overlaying reactant ports in the plate.

BRIEF DESCRIPTION OF THE DRAWINGS

FIG. 1 is a partially exploded isometric view of an electrochemical solid polymer fuel cell stack that incorporates an embodiment of an improved membrane electrode assembly that has integral fluid impermeable seals;

FIGS. 3A through 3D are partial section views of an edge portion of the membrane electrode assembly of FIGS. 2A and 2B, as indicated by the section marked in FIG. 2A;

DETAILED DESCRIPTION OF PREFERRED EMBODIMENT(S)

Figure 2A:
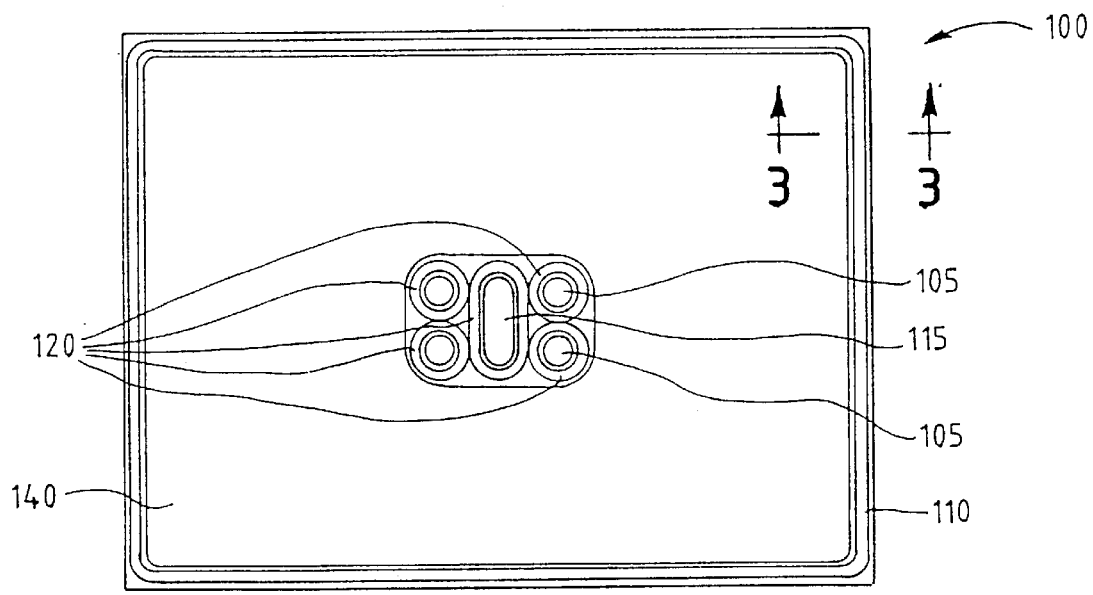
FIG. 2A is a plan view of an embodiment of the present improved membrane electrode assembly.

FIG. 1 illustrates a solid polymer electrochemical fuel cell stack 10, including a pair of end plate assemblies 20 and 30, and a plurality of stacked fuel cell assemblies 50, each comprising an MEA 100, and a pair of flow field plates 200. A tension member 60 extends between end plate assemblies 20 and 30 to retain and secure stack 10 in its assembled state. Spring 70 with clamping members 80 grip each end of tension member 60 to apply a compressive force to fuel cell assemblies 50 of stack 10.

Fluid reactant streams are supplied to and exhausted from internal manifolds and passages in stack 10 via inlet and outlet ports 40 in end plate assemblies 20 and 30. Aligned openings 105 and 205 in MEAs 100 and flow field plates 200, respectively, form reactant manifolds extending through stack 10.

In the illustrated embodiment, an integral perimeter seal 110 is provided around the outer edge of MEA 100. Integral manifold seals 120 circumscribe manifold openings 105. When stack 10 is secured in its assembled, compressed state, integral seals 110 and 120 cooperate with the adjacent pair of plates 200 to fluidly isolate fuel and oxidant reactant streams in internal reactant manifolds and passages, thereby isolating one reactant stream from the other and preventing the reactant streams from leaking from stack 10.

As illustrated in FIG. 1, each MEA 100 is positioned between the active surfaces of two flow field plates 200.

Each flow field plate 200 has flow field channels 210 on the active surface thereof (which contacts the MEA) for distributing fuel or oxidant fluid streams to the active area of the MEA 100. In the embodiment illustrated in FIG. 1, flow field channels 210 are fluidly connected to manifold openings 205 in plate 200 via supply/exhaust channels 220 (partially shown) located on the non-active surface of flow field plate 200 and ports 230 extending through plate 200.

In the illustrated embodiment, flow field plates 200 have a plurality of open-faced parallel channels 250 formed in the non-active surface thereof. Channels 250 on adjacent pairs of plates 200 cooperate to form passages extending through stack 10, through which a coolant stream, such as air, may be directed.

FIG. 2A shows an MEA 100 with integral seals 110, 120 that respectively circumscribe the electrochemically active area of MEA 100, and manifold openings 105 and opening 115 through which tension member 60 extends. MEA 100 comprises an ion exchange membrane (not visible in FIG. 2A) disposed between two porous, electrically conductive electrode layers 140. These electrode layers 140 may for example be carbon fiber paper. A sealant material, preferably a flow processable elastomer, such as, for example, a thermosetting liquid injection moldable compound (for example, silicones, fluoroelastomers, fluorosilicones, ethylene propylene di-methyl, and natural rubber), is impregnated into the porous electrode layers of MEA 100 to form integral seals 110 and 120.

Figure 2B:
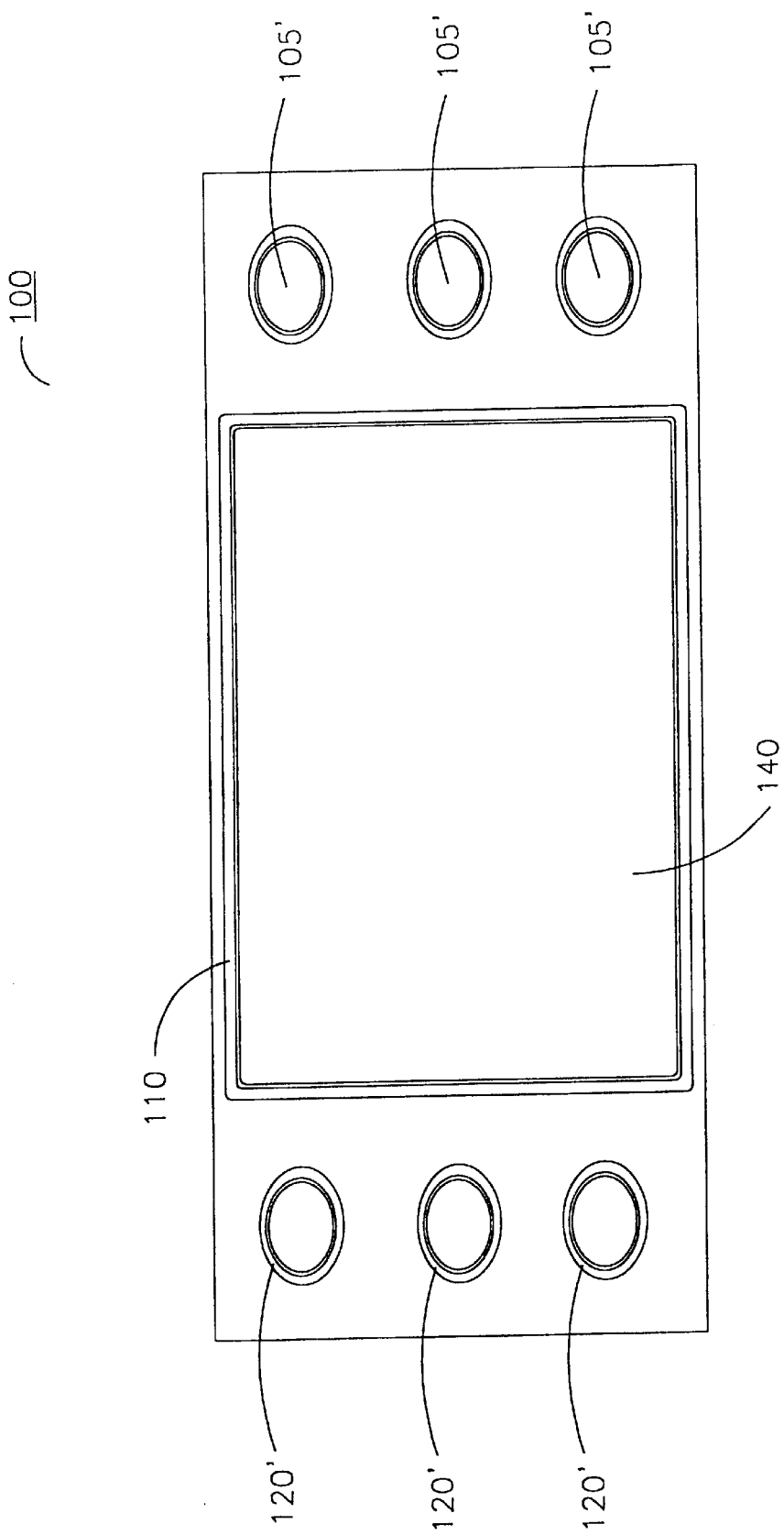
FIG. 2B is a plan view of another embodiment of the present improved membrane electrode assembly.

The present improved MEA is also applicable to different fuel cell stack configurations such as, for example, fuel cell stacks employing external reactant and/or coolant manifolds. FIG. 2B shows an MEA 100 with an integral seal 110 circumscribing the electrochemically active area of MEA 100. In this embodiment, the sealant material extends from opposing sides of MEA 100 to form and external region comprising integral seals 120' for sealing external manifold openings 105'. The embodiment shown in FIG. 2B illustrates a fuel cell stack that does not employ an internal tension member. However, MEA 100 of FIG. 2B may incorporate an internal opening for such a tension member and an integral perimeter seal circumscribing it, such as shown in FIG. 2A.

Various embodiments of an MEA 100 with an integral seal such as 110, are illustrated in cross-sectional views in FIGS. 3A through 3D. The figures depict a perimeter edge integral seal 110, such as through section 3—3 of FIG. 2A, although the same configurations could also be employed for integral seal 120 at a manifold opening (as in FIG. 1). Each embodiment of an MEA 100 comprises an ion exchange membrane 130 disposed between two porous, electrically conductive electrode layers 140, and a sealant material 125 impregnated into a portion 150 of the porous electrode layers of MEA 100. Preferably, at least a portion of seal 110 protrudes above the outer surface of porous electrode layers 140.

In all of the illustrated embodiments 3A through 3D, porous electrode layers 140 extend to the edge of ion exchange membrane 130. That is, the electrode layers 140 and the ion exchange membrane 130 are coextensive. The multi-layer MEA 100 may be assembled and then cut to the desired shape and dimensions; then the sealant material 125 may be impregnated into a portion 150 of the porous electrode layers 140. Alternatively, sealant material 125 can be impregnated into a sheet of MEA material. The integral seals for a plurality of MEAs could be injection molded onto the sheet of MEA material, impregnating a plurality of sealing regions of the porous electrode layers 140. After sealant material 125 has cured, the MEA 100 and sealant material 125 may both be cut (preferably in the sealing regions) to the desired dimensions at the same time. Because the sealant material was injection molded prior to the ion exchange membrane being cut, the two electrode layers are kept apart while the sealant material is being injected. Thus the electrode material in the sealing regions is embedded within the electrically insulating sealant material. Cutting the multi-layer material in the sealing regions after the sealant material cures, helps to prevent the possibility of short-circuiting because the cured sealant material immobilizes the embedded electrode material.

In the embodiment of FIG. 3A, integral seal 110 extends only as far as the edge of ion exchange membrane 130. That is, the edge of seal 110 is flush with the edge of membrane 130 and electrode layers 140. Therefore, the embodiment shown in FIG. 3A may be made by applying the sealant material before or after the MEA 100 is cut to the desired size and shape.

FIG. 3B illustrates a preferred embodiment. Similar to the embodiment of FIG. 3A, ion exchange membrane 130 is coextensive with porous electrode layers 140 and sealant material is impregnated into a portion 150 of porous electrode layers 140. Unlike the embodiment of FIG. 3A, sealant material 125 extends laterally beyond the edge of MEA 100, enveloping the edge of ion exchange membrane 130. By enveloping the edge, the sealant material 125 contacts three surfaces of ion exchange membrane 130, namely portions of the two surfaces that face the two electrodes 140 and the side edge defined by the thickness of membrane 130. Integral seal 110 has a single raised rib 160, in the region of the seal that extends beyond the membrane. FIG. 3B also shows an alignment feature in the form of a cylindrical plug or pin 162. Sealant material may be used to make plug 162 that may be molded and formed at the same time as integral seal 110. Plug 162 can cooperate with a corresponding cylindrical depression or well in the adjacent separator plate of a fuel cell to facilitate alignment of MEA 100 with the separator plates during assembly of the fuel cell.

FIG. 3C illustrates an embodiment of an integral seal 110 that has some of the same features as the embodiment depicted by FIG. 3B. However, instead of having only one rib on each face, the embodiment of FIG. 3C has three spaced ribs 165, 170, 175 and cross-ribs 180. Those skilled in the art will appreciate that additional ribs will increase the protection against leaks. A breach in one of the ribs will not result in a leak unless there are also breaches in the other parallel ribs. The benefit of the plurality of ribs is augmented by the cross-ribs 180 that compartmentalize the spaces between parallel ribs 165, 170, 175. With the compartmentalized spaces, a leak will not occur unless there is a breach in all three of ribs 165, 170, and 175 within the same compartment between a pair of spaced cross-ribs 180.

FIG. 3D illustrates a preferred embodiment of an integral seal 110 that shares some of the same features as the embodiments depicted by FIGS. 3B and 3C. However, one of the pairs of raised ribs is located in the sealing region that overlaps an edge portion of electrode layers 140 and superposes the membrane. An advantage of this embodiment is that the mechanical pressure that compresses ribs 190 exerts a pinching force on membrane layer 130 to help prevent fluid leaks around the edge of membrane layer 130. The embodiment of FIG. 3D may also employ cross-ribs 195 for further protection against fluid leaks. FIG. 3D also illustrates the feature of a raised reference edge 197, which may be formed from the sealant material. Reference edge 197 may be used to assist with aligning the MEA with the adjacent fuel cell components, which may be shaped to engage with reference edge 197. Alternatively, reference edge 197 may be used during the manufacturing process to seat the MEA against a guide surface of a machine used to assemble the fuel cells.

In the foregoing embodiments, the portion 150 where sealant material is impregnated into porous electrode layers 140 may be selected to assist in providing improved reactant flow across MEA 100. For example, referring back to FIG. 1, reactants flow through ports 230 extending through plates 200 in a direction tangential to the direction of flow in flow field channels 210. The portion 150 of MEA 100 may be selected to overlay ports 230, thereby assisting in directing the flow of reactants entering from ports 230 into flow field channels 210. Furthermore, the sealant-impregnated porous electrode layers may protect the portion of the ion exchange membrane overlaying ports 230, which may be vulnerable to damage by the pressure of reactants exiting ports 230.

Figure 4A:
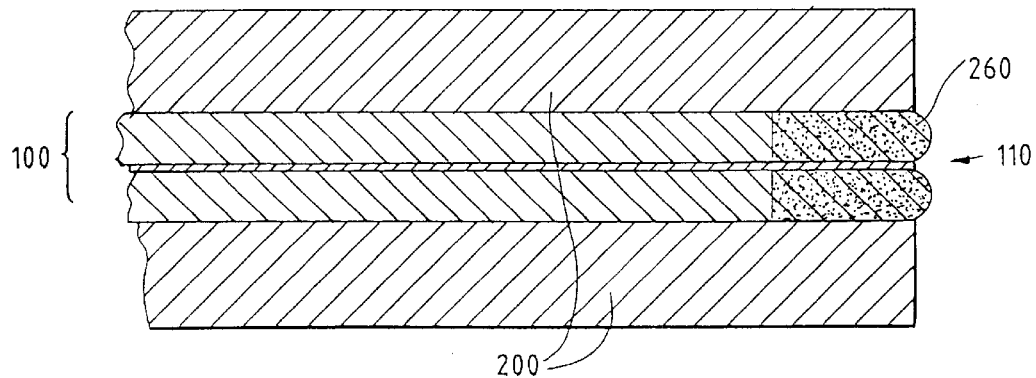
FIGS. 4A through 4C are partial section views of the edges of three embodiments of a membrane electrode assembly interposed between two fuel cell separator plates with integral seals compressed therebetween.
Figure 4B:
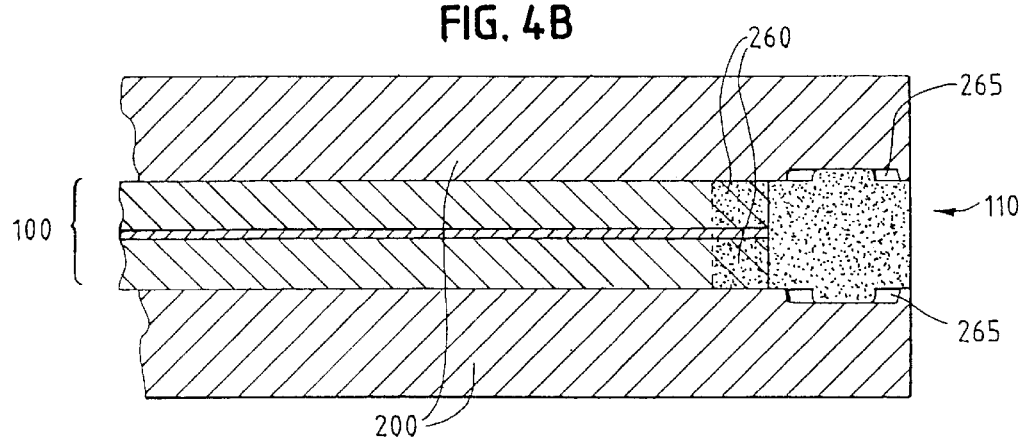
Figure 4C:
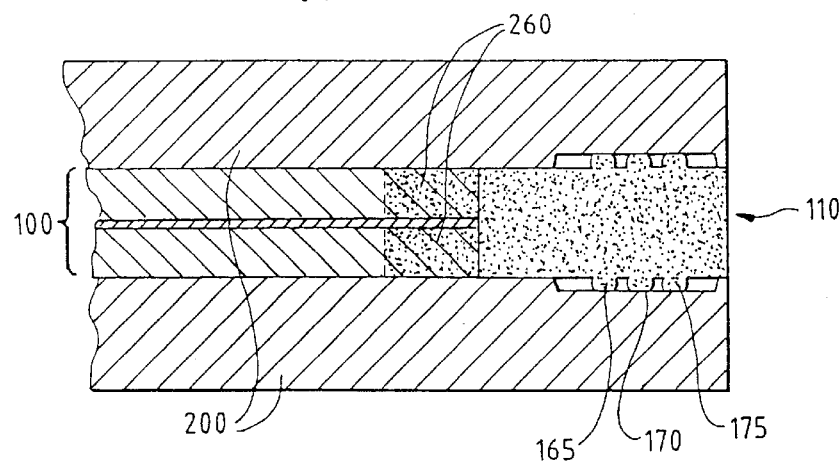

FIGS. 4A through 4C show an MEA 100 with an integral seal compressed between two fuel cell separator plates 200. Because at least a portion of MEA integral seal 110 is thicker and/or firmer than MEA 100, the compressive forces acting on the fuel cell stack compress seal 110 against active surfaces 260 of separator plates 200. FIG. 4A depicts the MEA of FIG. 3A compressed between two separator plates 200. FIG. 4B depicts the MEA of FIG. 3B compressed between two separator plates 200. FIG. 4B illustrates an embodiment of the invention wherein surface 260 of plate 200 includes a recessed groove 265. An advantage of this arrangement is that the recessed surface is less prone to scoring or other damage that may occur during the manufacturing process when a number of flow field plates 200 may be stacked one on top of the other. FIG. 4C depicts the MEA of FIG. 3C compressed between two flow field plates 200. FIG. 4C shows that the spacing between parallel ribs 165, 170, and 175 is sufficient to accommodate lateral bulging of the ribs under compression and still provide spaces therebetween.

Figure 5:
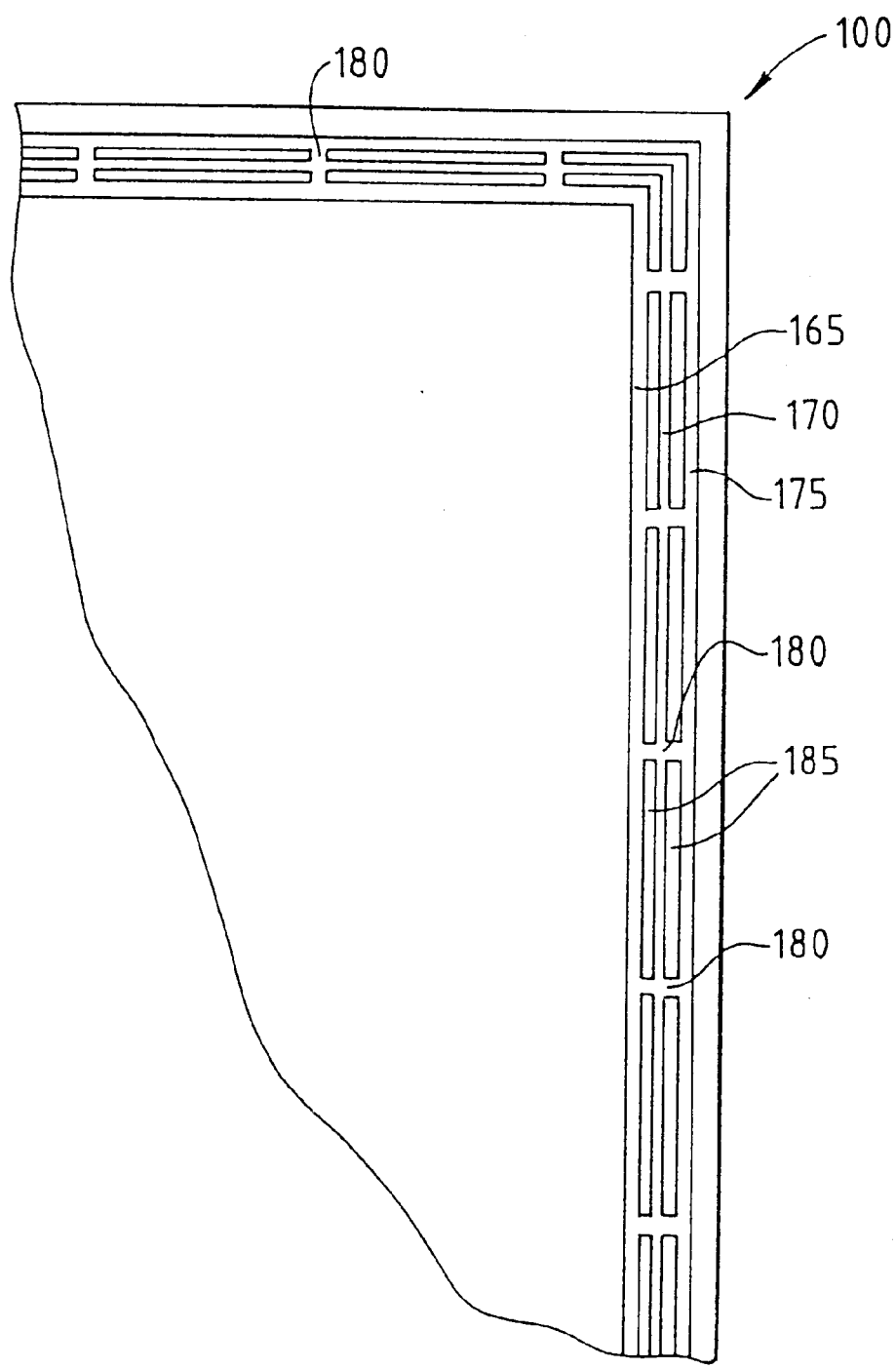
FIG. 5 is an enlarged plan view of a portion of a preferred embodiment of a membrane electrode assembly that has an integral seal that incorporates a plurality of seal ridges and cross-ridges.

FIG. 5 is a partial plan view of an MEA 100 with an integral perimeter edge seal 110 such as that shown in section view by FIG. 3C. Three spaced parallel ribs 165, 170 and 175 circumscribe the active area of MEA 100. Spaced cross-ribs 180 provide fluidly isolated compartments 185 between ribs 165, 170 and 175.

In the foregoing embodiments the resilient, fluid-impermeable sealant material may provide sealing of the MEA and other fuel cell components, as well as improved manufacturability, particularly in continuous methods of MEA production, as discussed above. However, it may be possible to use a rigid, fluid-impermeable sealant material such as epoxy, for example, for impregnating the edge portions of the MEA. The rigid, sealed portions of the MEA could then be cut in a continuous method and a resilient sealing compound applied thereto. Alternatively, separate resilient seals could be used in contact with the rigid, sealed portions of the MEA.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. An improved membrane electrode assembly for an electrochemical fuel cell, said membrane electrode assembly comprising:

(a) a first porous electrode layer;
   (b) a second porous electrode layer;
   (c) an ion exchange membrane interposed between said first and second porous electrode layers wherein said first and second electrode layers and said membrane are coextensive;
   (d) an electrocatalyst disposed at the interface between said ion exchange membrane and each of said first and second porous electrode layers, thereby defining an electrochemically active area on each of said first and second electrode layers; and
   (e) a resilient fluid impermeable integral seal that is integral with said membrane electrode assembly, said seal comprising a fluid impermeable sealant material impregnated into said first and second porous electrode layers in sealing regions thereof and extending laterally beyond said membrane and said electrode layers to an external region, wherein said sealing regions comprise regions that circumscribe said electrochemically active area, and wherein said external region comprises regions that circumscribe external manifold openings therein.

2. The membrane electrode assembly of claim 1 wherein said sealing regions comprise regions that circumscribe a second opening within said membrane electrode assembly.

3. The membrane electrode assembly of claim 1 further comprising an alignment member molded from said sealant material wherein said alignment member comprises a surface for assisting alignment of the MEA during assembly of said fuel cell.

4. The membrane electrode assembly of claim 3 wherein said alignment member is a protrusion extending perpendicular to a face of said membrane electrode assembly, said protrusion cooperating with a corresponding depression in an a adjacent separator plate of said fuel cell.

5. The membrane electrode assembly of claim 1 wherein said sealant material is an electrical insulator and said seal envelopes a peripheral region of both first and second electrodes and said ion exchange membrane.

6. The membrane electrode assembly of claim 3 wherein an outer edge of said integral seal comprises a reference edge for assisting assembly of said fuel cell.

7. The membrane electrode assembly of claim 1 wherein said sealant material is an elastomeric material.

8. The membrane electrode assembly of claim 7 wherein said elastomeric material is a thermosetting liquid injection moldable compound.

9. The membrane electrode assembly of claim 7 wherein said elastomeric material is selected from the group consisting of silicones, fluorosilicones, fluoroelastomers, ethylene propylene di-methyl, and natural rubber.

10. The membrane electrode assembly of claim 1 wherein said integral seal further comprises at least one raised rib.

11. The membrane electrode assembly of claim 10 wherein said at least one raised rib comprises a plurality of raised ribs.

12. The membrane electrode assembly of claim 1 wherein said integral seal comprises a plurality of cross-ribs that extend between said plurality of ribs, thereby forming compartmentalized seals.

13. The membrane electrode assembly of claim 10 wherein said at least one raised rib comprises a pair of ribs, wherein a first rib is located in said sealing region where said sealant material is impregnated into said first porous electrode layer and a second rib is located in said sealing region where said sealant material is impregnated into said second porous electrode layer such that said first rib is opposite to said second rib.

14. An improved membrane electrode assembly for an electrochemical fuel cell, said membrane electrode assembly comprising:
   (a) a first porous electrode layer;
   (b) a second porous electrode layer;
   (c) an ion exchange membrane interposed between said first and second porous electrode layers wherein said first and second electrode layers and said membrane are coextensive;
   (d) an electrocatalyst disposed at the interface between said ion exchange membrane and said first and second porous electrode layers, said electrocatalyst defining an electrochemically active area; and
   (e) a resilient fluid impermeable integral seal that is integral with said membrane electrode assembly comprising a fluid impermeable sealant material impregnated into said first and second porous electrode layers in sealing regions thereof,
   wherein said sealing regions comprise regions that circumscribe and extend into said electrochemically active area, and at least a portion of said sealing regions overlay reactant distribution ports of an adjacent fluid flow field plate.

* * * * *